(12) United States Patent
Lin

(10) Patent No.: US 10,832,596 B1
(45) Date of Patent: Nov. 10, 2020

(54) FLEXIBLE HANGING LABEL MANUFACTURING METHOD AND STRUCTURE

(71) Applicant: Hui Tu Lin, Changhua (TW)

(72) Inventor: Hui Tu Lin, Changhua (TW)

( * ) Notice: Subject to any disclaimer, the term of this patent is extended or adjusted under 35 U.S.C. 154(b) by 0 days.

(21) Appl. No.: 16/452,428

(22) Filed: Jun. 25, 2019

(51) Int. Cl.
*G09F 3/02* (2006.01)
*B31D 1/02* (2006.01)
*C09J 7/29* (2018.01)

(52) U.S. Cl.
CPC ............... *G09F 3/02* (2013.01); *B31D 1/021* (2013.01); *B31D 1/026* (2013.01); *B31D 1/027* (2013.01); *C09J 7/29* (2018.01); *C09J 2203/334* (2013.01); *C09J 2400/283* (2013.01); *G09F 2003/0227* (2013.01); *G09F 2003/0229* (2013.01)

(58) Field of Classification Search
CPC ..... B32B 2307/7265; B32B 7/12; B32B 5/26; B32B 2255/26; B32B 2255/02; B32B 2255/205; B32B 3/266; B32B 5/024
See application file for complete search history.

(56) References Cited

U.S. PATENT DOCUMENTS 7,836,622 B1 * 11/2010 King .................. G09F 3/14
40/665
2014/0048548 A1 * 2/2014 Heinrichs ............ B65D 23/12
220/694

* cited by examiner

*Primary Examiner* — Vishal I Patel
(74) *Attorney, Agent, or Firm* — Guice Patents PLLC

(57) ABSTRACT

The present invention relates to a flexible hanging label manufacturing method and structure, the manufacturing method includes the following steps: a. printing a label paper strip; b. attaching a first flexible paper layer and a second flexible paper layer to an attached portion of the label paper strip; and c. cutting. The flexible hanging label manufactured by the above steps would achieve consistent production operations, to thereby improve the anti-pull strength of the flexible hanging labels, to effectively reduce the fraction defective caused by use damage.

3 Claims, 10 Drawing Sheets

FLEXIBLE HANGING LABEL MANUFACTURING METHOD AND STRUCTURE

FIELD OF THE INVENTION

The present invention relates to a flexible hanging label manufacturing method and structure, to thereby achieve consistent production operations, to thereby improve the anti-pull strength of the flexible hanging labels, to effectively reduce the fraction defective caused by use damage.

DESCRIPTION OF PRIOR ART

In order to promote products and enhance the sense of value, various conspicuous labels are used to be hanged on the packing containers of many products in the stores to attract consumers' attention. The hanging label structure changes over time, a simple structure in early days is a label card with a hanging hole for hanging on a container, later the structure is a label card with a flexible string tied on it, and currently the flexible hanging label structure is prevailing, these labels can really achieve good promotional effect, especially the flexible hanging label, it is widely loved by the industry because it has the advantages of easy mass production and convenient for hanging, relative prior arts may be referred to cited references U.S. Pat. Nos. 7,281,345B2, D723621S, 7,941,953B2, 9,105,204B2, 10,189,588B2, 10,189,602B2.

As above, the flexible hanging labels manufactured by the cited references have already been provided by consistent production operations, the structure is mainly an attached portion set on a side of a printed label and the attached portion is correspondingly attached to an attached portion of a flexible body with a loop. It can be mass produced by automation, but some drawbacks are found in actual use that the printed label may easily be torn from the edge of the attached portion due to unilateral stretching force of the flexible body in some situations, such as labels may be frequently replaced from packing containers in the promotion periods, pulling force is too large when hanging, so that the damaged flexible hanging label can no longer be used, a too high fraction defective has been widely criticized by the industry.

SUMMARY OF THE INVENTION

In view of the drawbacks of conventional flexible hanging labels, the inventor finally completed the flexible hanging label manufacturing method and structure of the present invention after numerous improvements, namely, two objects of the present invention are:

The first object of the present invention is to provide a flexible hanging label manufacturing method, to achieve consistent production operations, to thereby effectively improve anti-pull strength of labels and reduce manufacturing costs.

The second object of the present invention is to provide a flexible hanging label structure, which could solve the problem of conventional labels that may be torn easily during being hanged, to thereby improve the anti-pull strength of the flexible hanging labels, to effectively reduce the fraction defective caused by use damage.

To achieve the objects of the present invention, the flexible hanging label manufacturing method of the present invention includes the following steps:

a. printing a label paper strip;

b. attaching a first flexible paper layer and a second flexible paper layer to an attached portion of the label paper strip; and c. cutting.

The flexible hanging label structure of the present invention, including a label body, a first flexible loop and a second flexible loop, wherein:

the label body, a first paper surface and a second paper surface are set on it, a first attached portion is set on a side of the first paper surface, a second attached portion is set on a side of the second paper surface, the position of the first attached portion and the position of the second attached portion are corresponding to each other;

the first flexible loop, which is a flexible slice, a first connection portion is set on the first flexible loop, a first loop body is extended outward from a side of the first connection portion, a third attached portion is set on the inner side of the first connection portion, an adhesive layer is set on the surface of the third attached portion for attaching to the first attached portion;

the second flexible loop, which is a flexible slice, a second connection portion is set on the second flexible loop, a second loop body is extended outward from a side of the second connection portion, a fourth attached portion is set on the inner side of the second connection portion, an adhesive layer is set on the surface of the fourth attached portion for attaching to the second attached portion, the second loop body is correspondingly attached to the first loop body to form a loop portion.

The flexible hanging label manufacturing method of the present invention could achieve consistent production operations, to thereby reduce manufacturing costs; its structure could solve the problem of conventional labels that may be torn easily during being hanged, to thereby improve the anti-pull strength of the flexible hanging labels, to effectively reduce the fraction defective caused by use damage.

DETAILED DESCRIPTION OF THE INVENTION

Please refer to FIG. 1 to FIG. 5, which is the manufacturing method A of the flexible hanging label of the present invention, including the following steps:

a. printing a label paper strip P;

b. attaching a first flexible paper layer 2 and a second flexible paper layer 3 to an attached portion P1 of the label paper strip P; and c. cutting.

Figure 1:
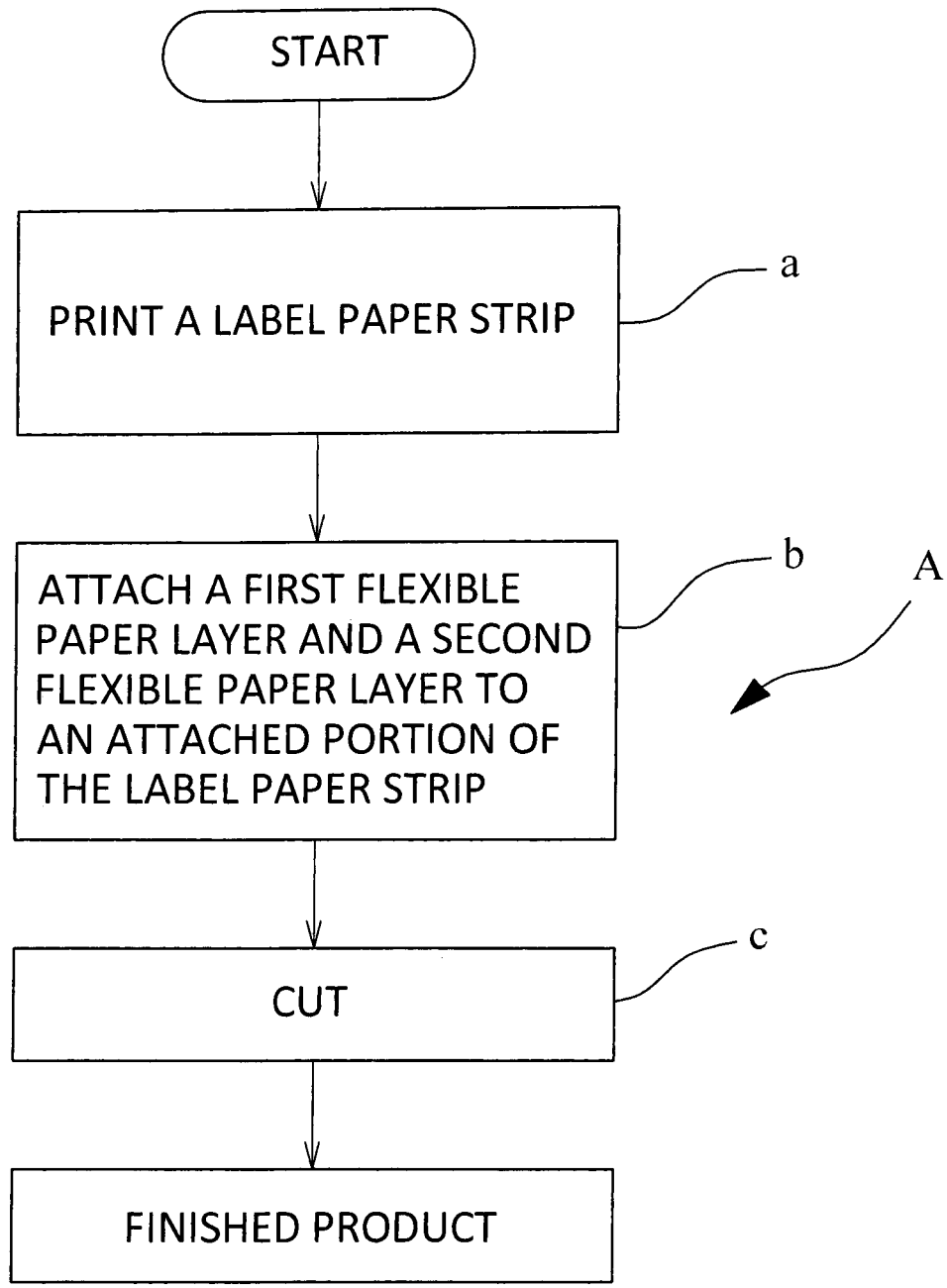
FIG. 1 is a flow chart of the manufacturing process of the present invention.
Figure 2:
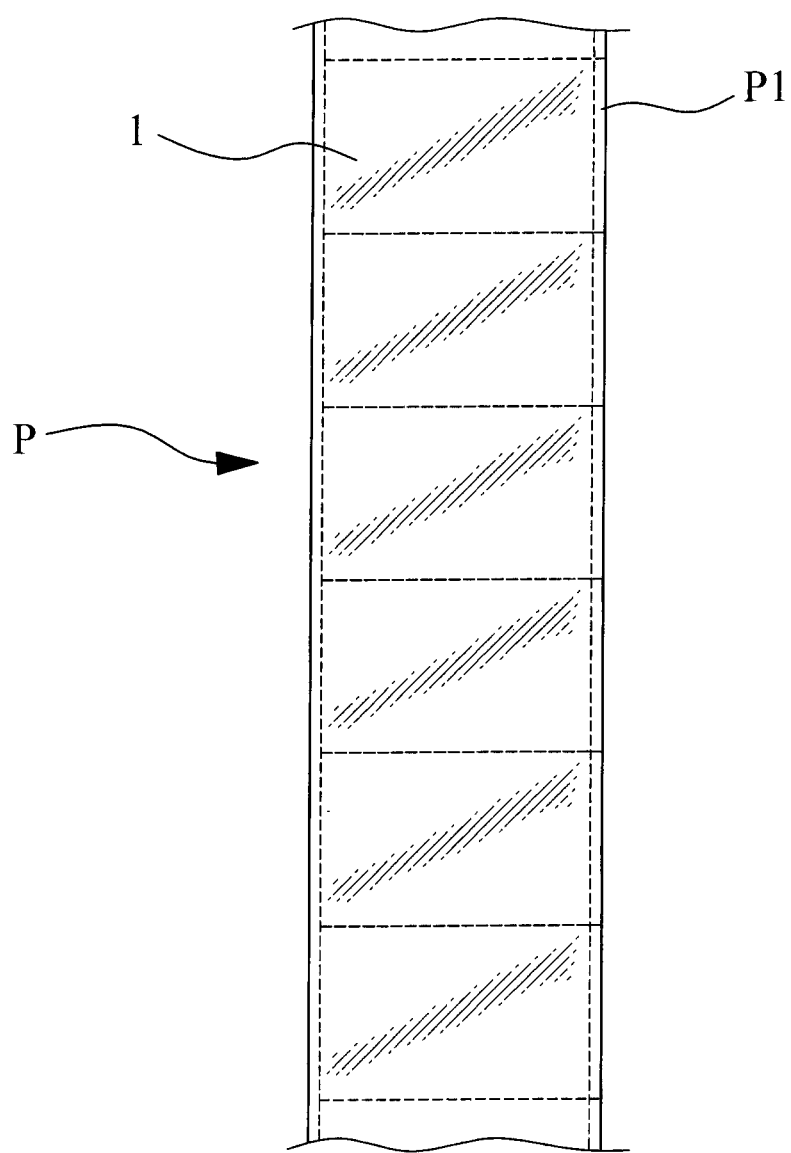
FIG. 2 is a schematic diagram of the label paper strip of the present invention.
Figure 3:
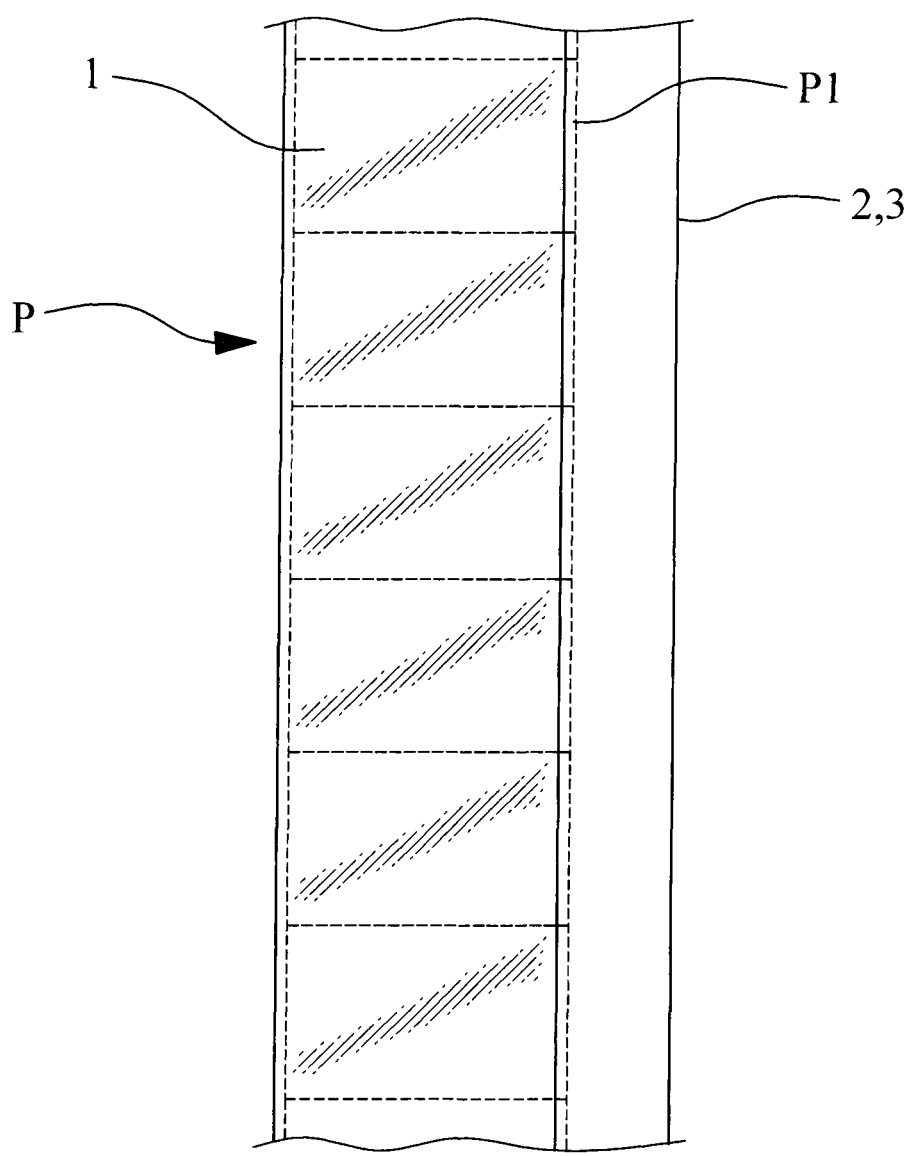
FIG. 3 is a schematic diagram of the label paper strip attaching to the first and second flexible paper layers of the present invention.
Figure 5:
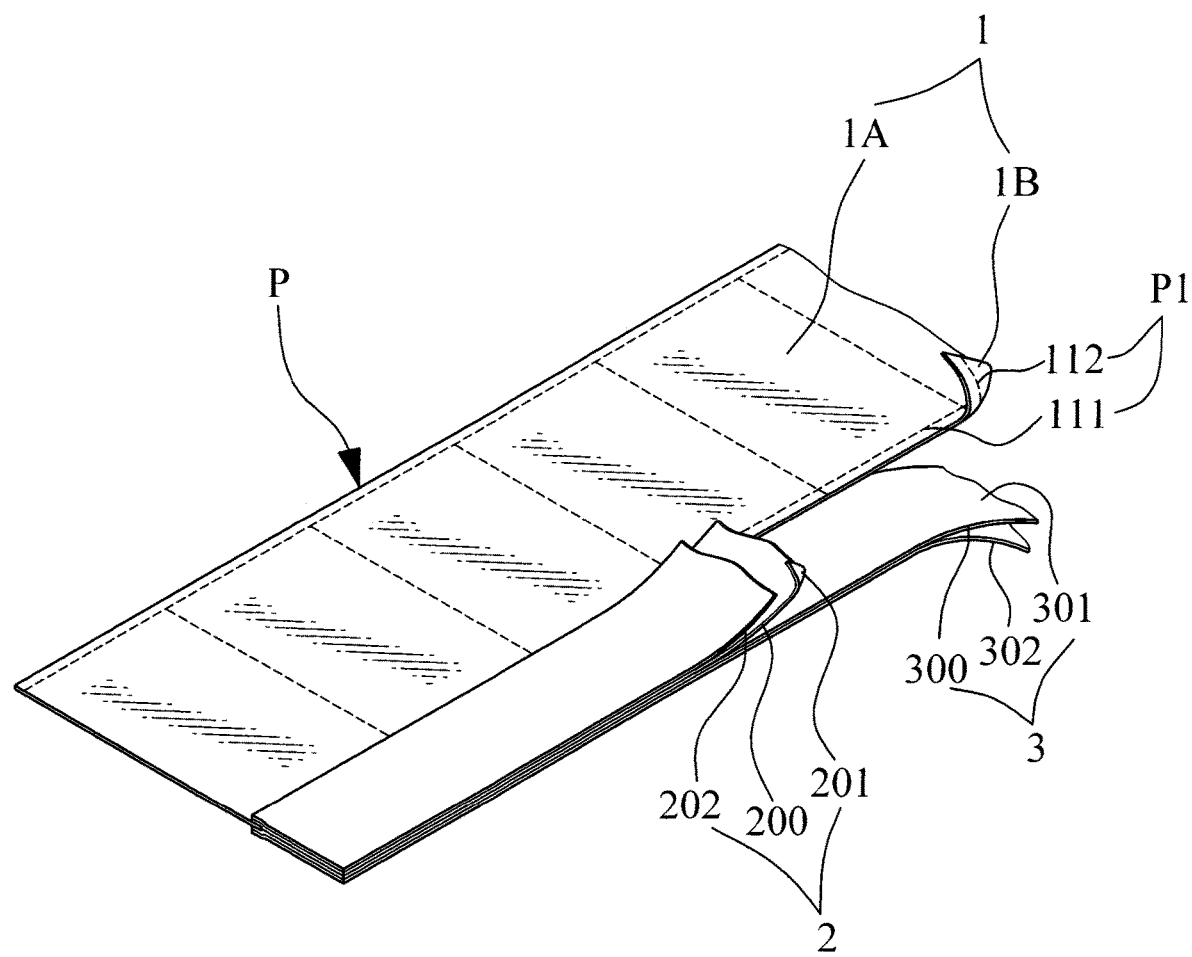
FIG. 5 is a three-dimensional schematic diagram of attaching of the label paper strip of the present invention.

In the above step a, the label paper strip P is a printing paper roll, multiple label bodies 1 are printed side by side on the label paper strip P, front of the label body 1 is a first paper surface 1A, back of the label body 1 is a second paper surface 1B, the attached portion P1 is set on the label body, the attached portion P1 includes a first attached portion 111 set on a side of the first paper surface 1A and a second attached portion 112 set on a side of the second paper surface 1B, the position of the first attached portion 111 and the position of the second attached portion 112 are corresponding to each other (please refer to FIG. 2 and FIG. 5).

In the above step b, the first flexible paper layer 2 includes a first flexible layer 200 and a first protective paper 202, due to physical properties of the materials, the first flexible layer 200 is flatly attached to the first protective paper 202 without adhesive on the outer side of the first flexible layer 200, adhesive is used on the inner side of the first flexible layer 200 to form an adhesive layer 201. The second flexible paper layer 3 includes a second flexible layer 300 and a second protective paper 302, due to physical properties of the materials, the second flexible layer 300 is flatly attached to the second protective paper 302 without adhesive on its outer side, adhesive is used on the inner side of the second flexible layer 300 to form an adhesive layer 301. A part of the adhesive layer 201 of the first flexible paper layer 2 is correspondingly attached to the first attached portion 111 of the label body 1 in the label paper strip P, and the rest part is correspondingly attached to the adhesive layer 301 of the second flexible layer 300. Similarly, a part of the adhesive layer 301 of the second flexible paper layer 3 is correspondingly attached to the second attached portion 112 of the label body 1 in the label paper strip P.

Figure 4:
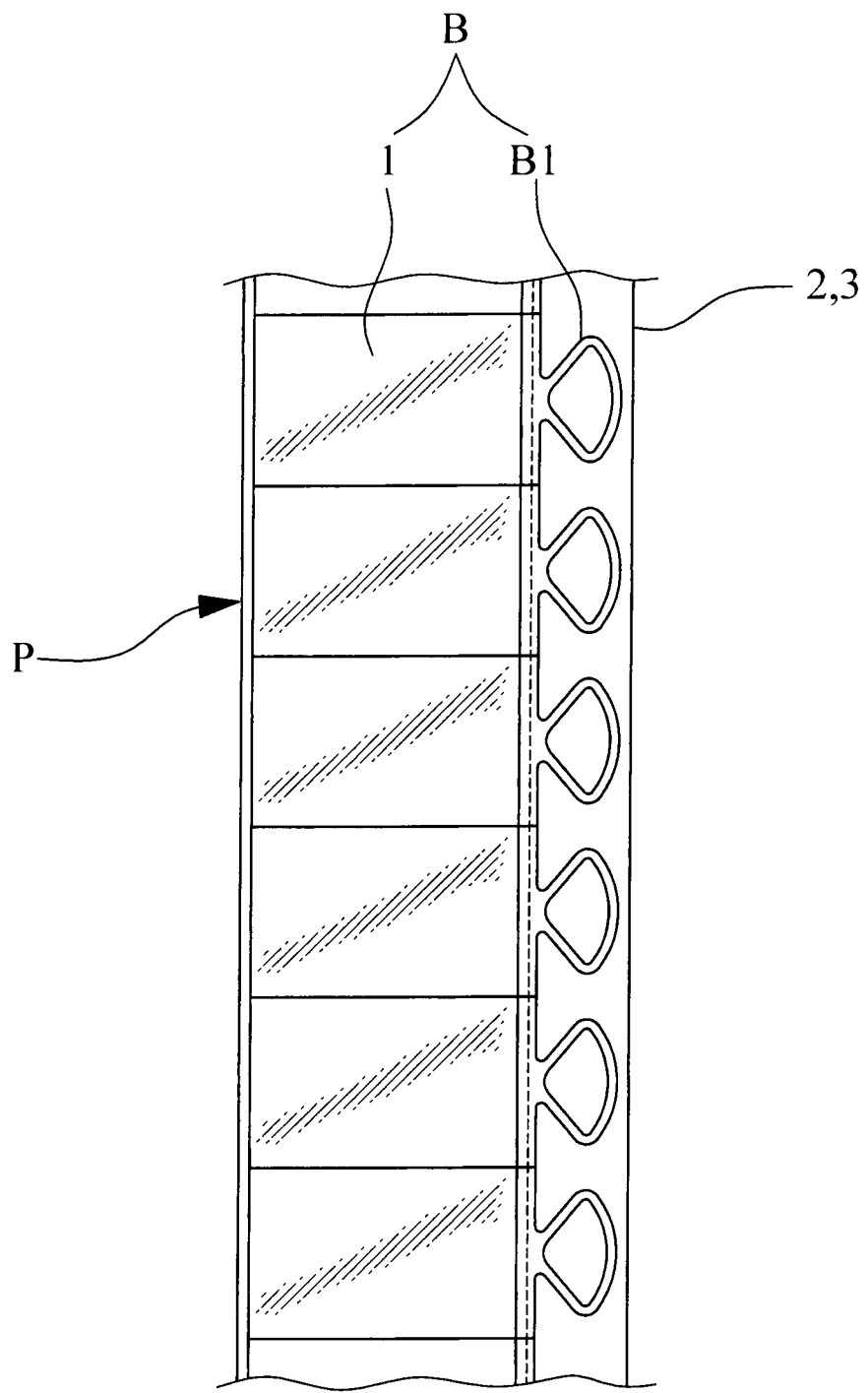
FIG. 4 is a schematic diagram of cutting of the present invention.
Figure 9:
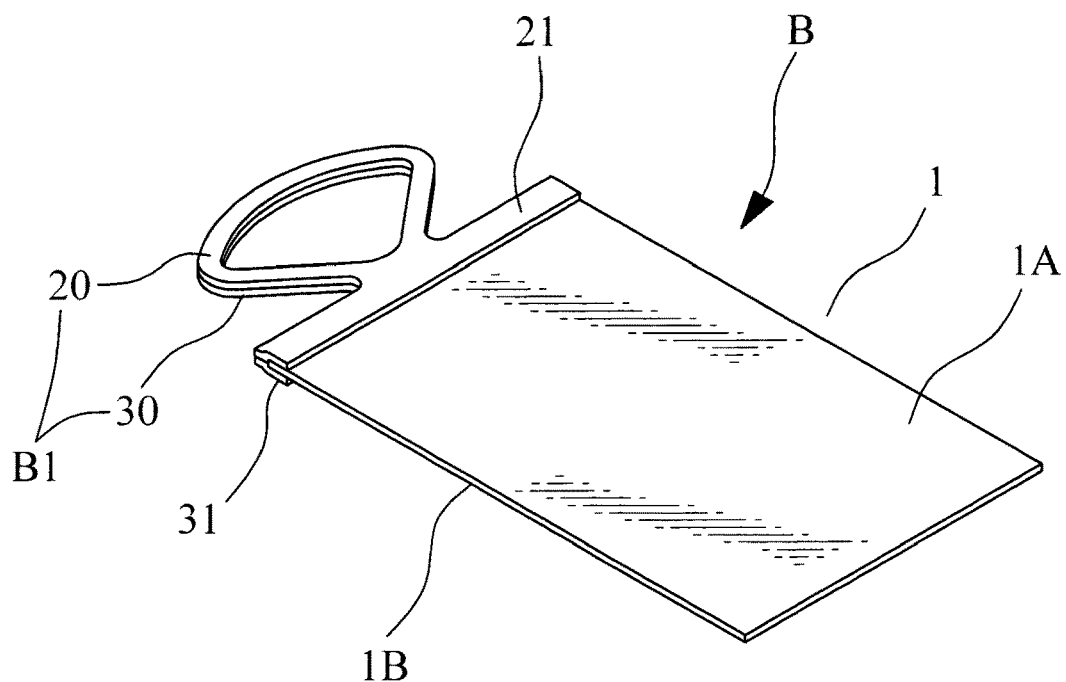
FIG. 9 is a three-dimensional schematic diagram of the flexible hanging label of the present invention.

As shown in FIG. 4 and FIG. 9, in the step c, when the label paper strip P is attached to the first flexible paper layer 2 and the second flexible paper layer 3, a finished product of the flexible hanging label B is cut according to the shape of the flexible hanging label B. The flexible hanging label B includes a label body 1 and a loop portion B1, the loop portion B1 is composed of a first flexible loop 20 and a second flexible loop 30 attaching to each other.

The flexible hanging label B manufactured by the above steps would achieve consistent production operations, to thereby improve the anti-pull strength of the flexible hanging labels, to effectively reduce the fraction defective caused by use damage.

Figure 6:
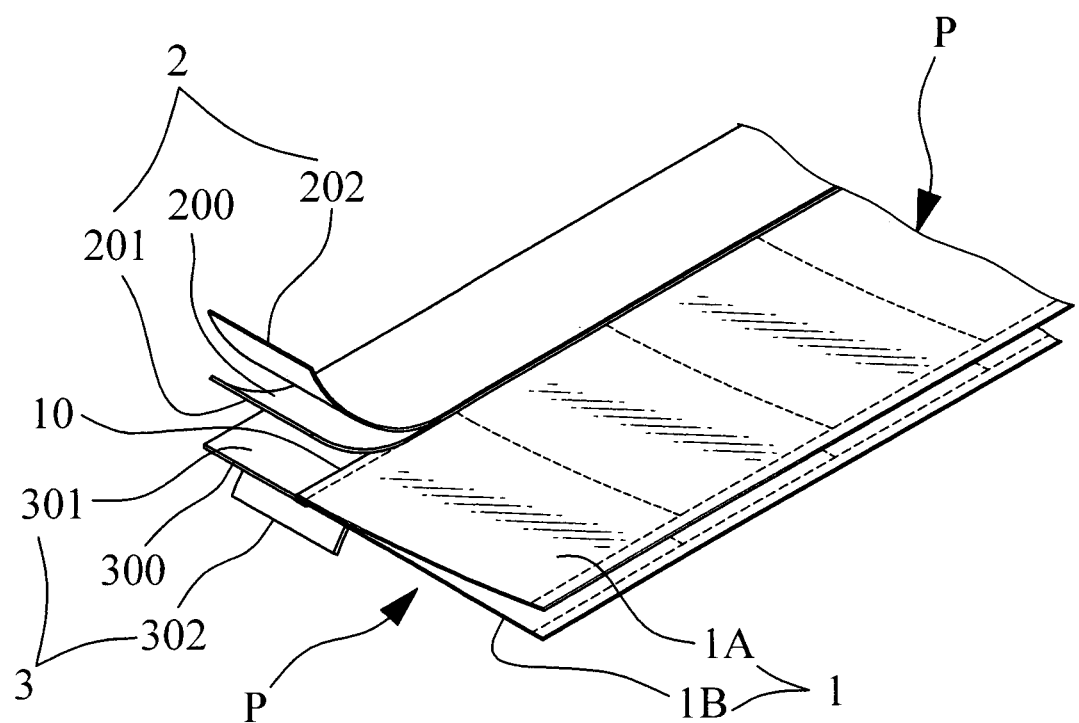
FIG. 6 is a three-dimensional schematic diagram of attaching of the label paper strip of another embodiment of the present invention.
Figure 12:
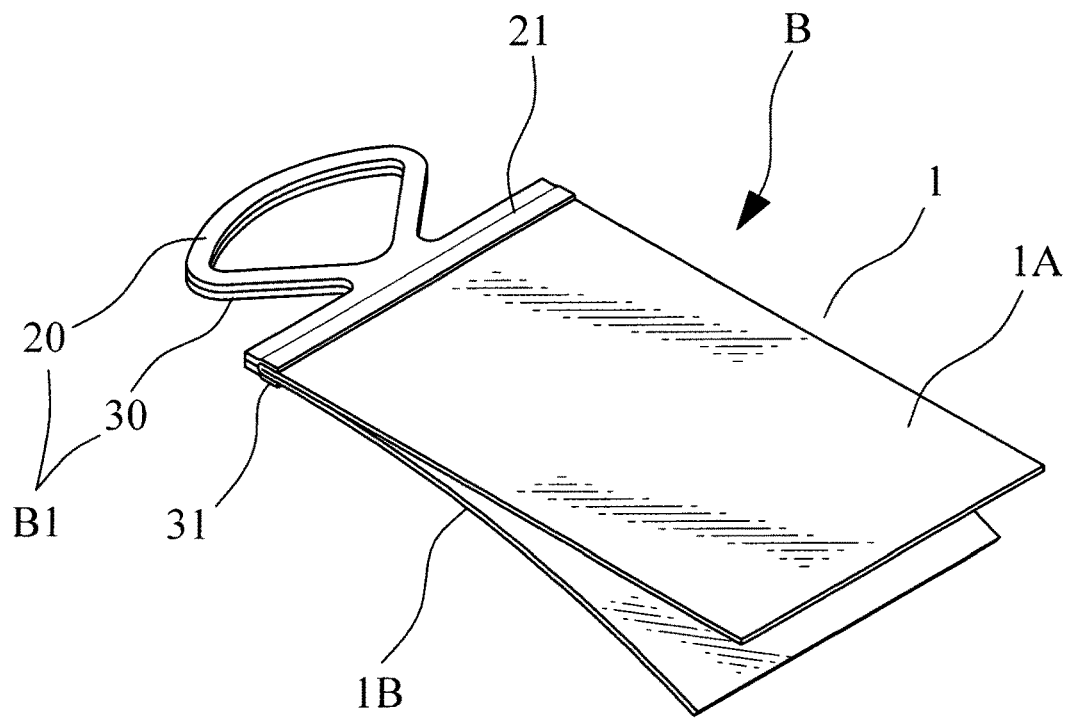
FIG. 12 is a three-dimensional schematic diagram of another embodiment of the flexible hanging label of the present invention.

In the above embodiment, the label paper strip P is a one-piece label printing paper roll. If a user wants to manufacture a folded label by using the label paper strip P (as shown in FIG. 12), the steps of manufacturing method is the same as the above embodiment, wherein the label paper strip P is a folded label printing paper roll (as shown in FIG. 6), the label body 1 in the label paper strip P is a folded paper piece with a fold line 10, a paper surface 1A and a second paper surface 1B are divided from the fold line 10, the attached portion P1 includes a first attached portion 111 and the second attached portion 112, the first attached portion 111 is located on the side of the first paper surface 1A close to the fold line 10, the second attached portion 112 is set on the side of the second paper surface 1B close to the fold line 10, the position of the first attached portion 111 and the position of the second attached portion 112 are corresponding to each other (please refer to FIG. 2, FIG. 6, FIG. 10), according to the step b, wherein a part of the adhesive layer 201 of the first flexible layer 200 is correspondingly attached to the first attached portion 111 of the label body 1 in the label paper strip P and the other part is correspondingly attached to the adhesive layer 301 of the second flexible layer 300, similarly, a part of the adhesive layer 301 of the second flexible layer 300 is also correspondingly attached to the second attached portion 112 of the label body 1.

Figure 7:
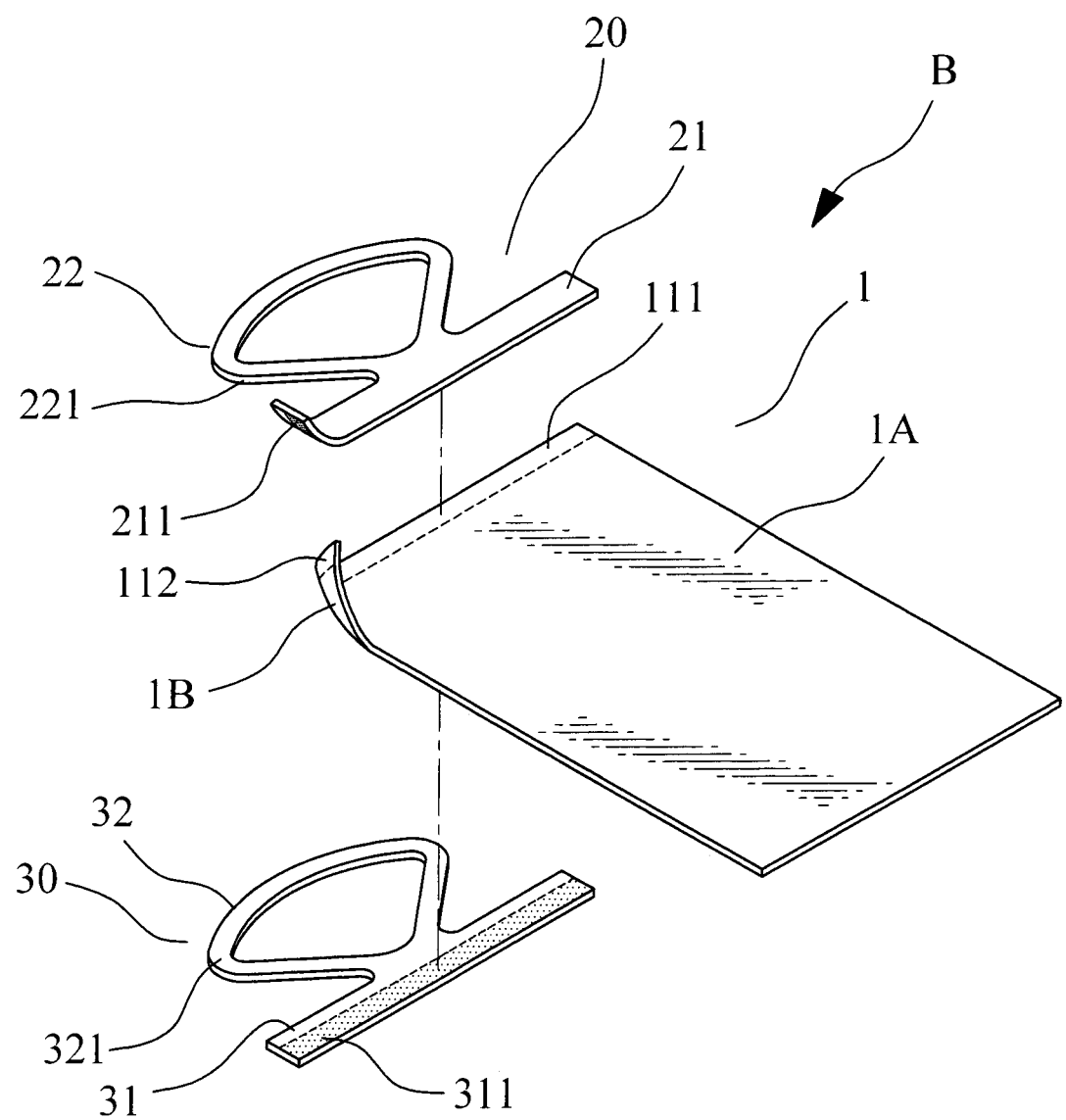
FIG. 7 is a three-dimensional exploded diagram of the flexible hanging label of the present invention.
Figure 8:
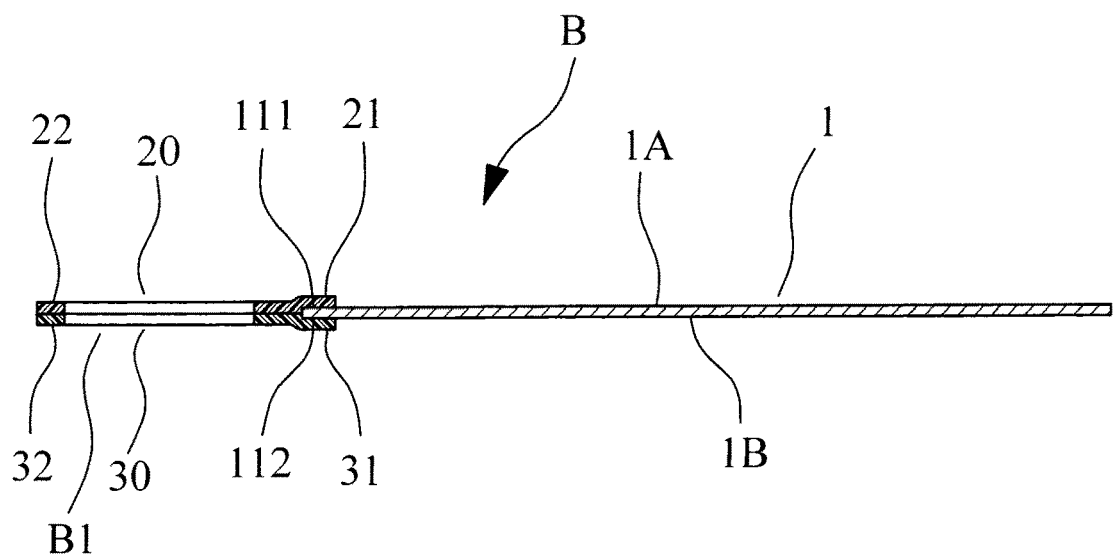
FIG. 8 is a cross-sectional diagram of the assembly of the flexible hanging label of the present invention.

Please refer to FIG. 7 to FIG. 9, it is an embodiment of the structure of the flexible hanging label B of the present invention, which includes a label body 1, a first flexible loop 20 and a second flexible loop 30, wherein:

the label body 1, which is a one-piece label, front of the label body 1 is the first paper surface 1A, back of the label body 1 is the second paper surface 1B, a first attached portion 111 is set on a side of the first paper surface 1A, a second attached portion 112 is set on a side of the second paper surface 1B, the position of the first attached portion 111 and the position of the second attached portion 112 are corresponding to each other;

the first flexible loop 20, which is a flexible slice, a first connection portion 21 is set on the first flexible loop 20, a first loop body 22 is extended outward from a side of the first connection portion 21, a third attached portion 211 is set on the inner side of the first connection portion 21, an adhesive layer is set on the surface of the third attached portion 211 for attaching to the first attached portion 111;

the second flexible loop 30, which is a flexible slice, a second connection portion 31 is set on the second flexible loop 30, a second loop body 32 is extended outward from a side of the second connection portion 31, a fourth attached portion 311 is set on the inner side of the second connection portion 31, an adhesive layer is set on the surface of the fourth attached portion 311 for attaching to the second attached portion 112, the second loop body 32 is correspondingly attached to the first loop body 22 to form a loop portion B1.

Figure 10:
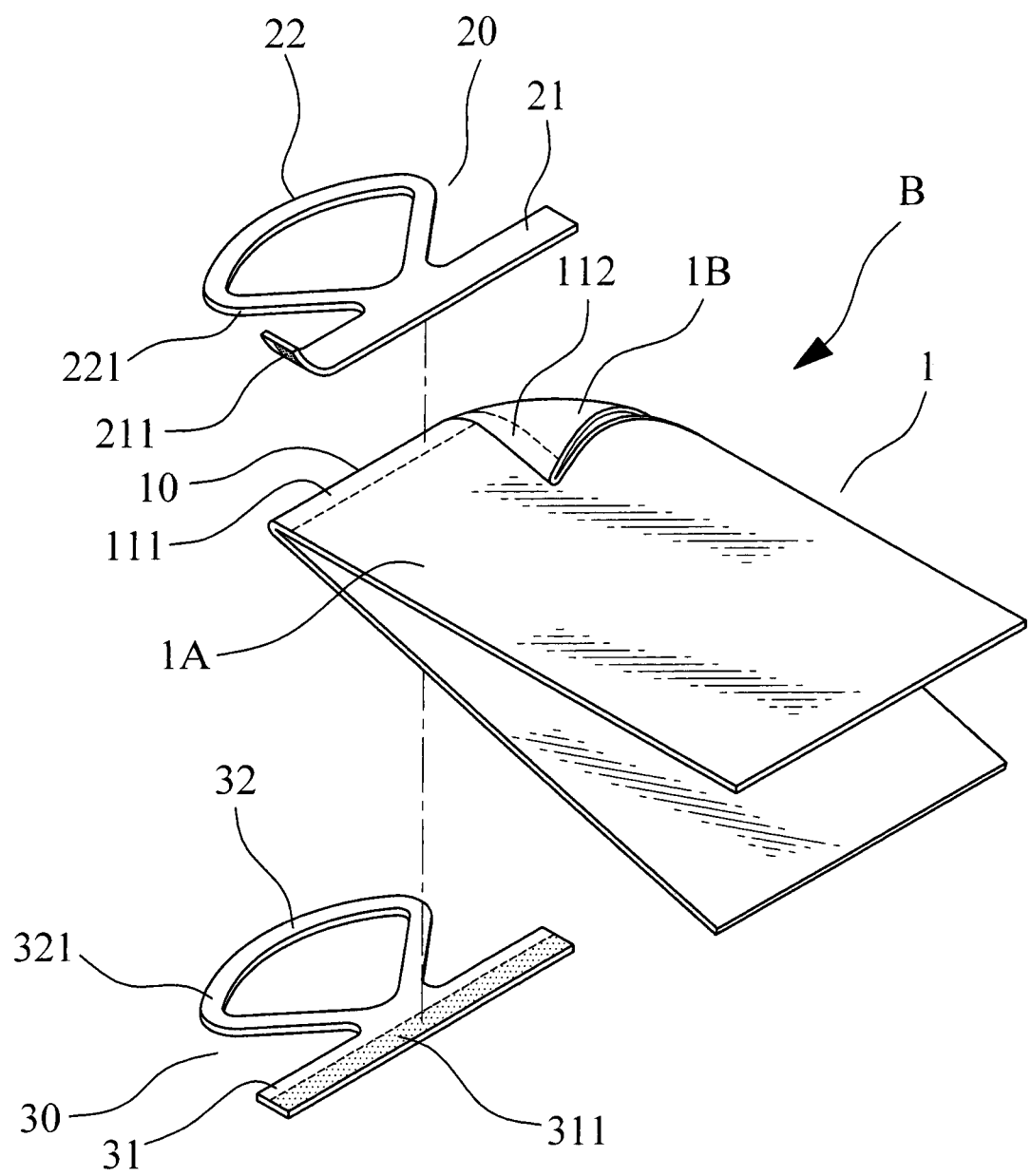
FIG. 10 is a three-dimensional exploded diagram of another embodiment of the flexible hanging label of the present invention.
Figure 11:
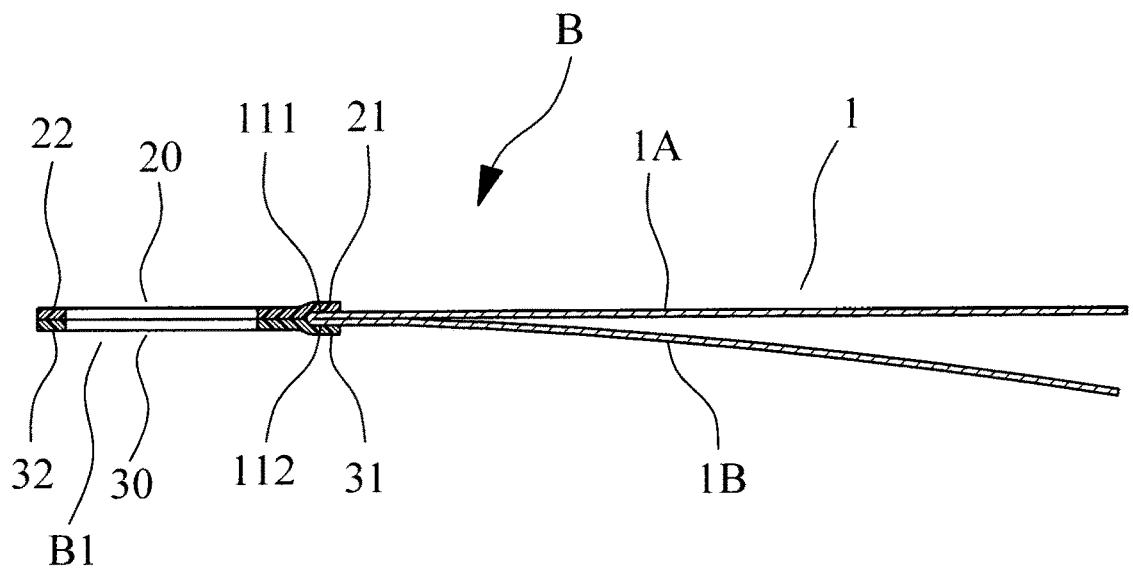
FIG. 11 is a cross-sectional diagram of the assembly of the flexible hanging label of another embodiment of the present invention.

Please refer to FIG. 10 to FIG. 12, it is another embodiment of the structure of the flexible hanging label B of the present invention, which includes a label body 1, a first flexible loop 20 and a second flexible loop 30, wherein:

the label body 1, which is a folded label, the label body 1 is a folded paper piece with a fold line 10, a first paper surface 1A and a second paper surface 1B are divided from the fold line 10, a first attached portion 111 is set on the side of the first paper surface 1A close to the fold line 10, a second attached portion 112 is set on the side of the second paper surface 1B close to the fold line 10, the position of the first attached portion 111 and the position of the second attached portion 112 are corresponding to each other;

the first flexible loop 20, which is a flexible slice, a first connection portion 21 is set on the first flexible loop 20, a first loop body 22 is extended outward from a side of the first connection portion 21, a third attached portion 211 is set on the inner side of the first connection portion 21, an adhesive layer is set on the surface of the third attached portion 211 for attaching to the first attached portion 111;

the second flexible loop 30, which is a flexible slice, a second connection portion 31 is set on the second flexible loop 30, a second loop body 32 is extended outward from a side of the second connection portion 31, a fourth attached portion 311 is set on the inner side of the second connection portion 31, an adhesive layer is set on the surface of the fourth attached portion 311 for attaching to the second attached portion 112, the second loop body 32 is correspondingly attached to the first loop body 22 to form a loop portion B1.

By the above composition, a loop portion B1 is formed by correspondingly attaching the first flexible loop 20 and the second flexible loop 30, the third attached portion 211 and the fourth attached portion 311 are respectively attached to the two sides of the label body 1 (namely, the first paper surface 1A and the second paper surface 1B), so that the anti-pull strength of the loop portion B1 can be strengthened during hanging operation, to thereby avoid being torn at the attached edge of the label body 1 and the loop portion B1, to effectively reduce the destruction rate of hanging operation.

What is claimed is:

1. A flexible hanging label manufacturing method, including the following steps:
    a. printing a label paper strip;
    b. attaching a first flexible paper layer and a second flexible paper layer to an attached portion of the label paper strip, wherein the attached portion is set on a first paper surface of the label paper strip to attach the first flexible paper layer and a second paper surface of the label paper strip to attach the second flexible paper layer, the first flexible paper layer and the second flexible paper layer are partially attached with each other; and
    c. cutting the label paper strip, the first flexible paper layer and the second flexible paper layer, wherein the label paper strip is configuring to form a label body, the first flexible paper layer and the second flexible paper layer are configuring to form a loop portion of the label body on an overlapping portion of the first flexible paper layer and the second flexible paper layer.

2. The flexible hanging label manufacturing method as claimed in claim 1, wherein in the step a, the label paper strip is a printing paper roll, multiple label bodies are printed side by side on the label paper strip.

3. The flexible hanging label manufacturing method as claimed in claim 1, wherein in the step b, the first flexible paper layer includes a first flexible layer and a first protective paper, the first flexible layer is flatly attached to the first protective paper, an adhesive layer is set on the inner side of the first flexible layer, a part of the adhesive layer on the inner side of the first flexible layer is attached to the attached portion on the label paper strip and the rest part is attached to the first flexible layer, the second flexible paper layer includes a second flexible layer and a second protective paper, the second flexible layer is flatly attached to the second protective paper, another adhesive layer is set on the inner side of the second flexible layer, a part of the another adhesive layer on the inner side of the second flexible layer is attached to the attached portion on the label paper strip and the rest part is attached to the rest part of the adhesive layer of the first flexible layer.

\* \* \* \* \*